United States Patent [19]
Kim et al.

[11] Patent Number: 5,864,004
[45] Date of Patent: Jan. 26, 1999

[54] FLAME RETARDANT POLYMER RESIN COMPOSITION HAVING IMPROVED HEAT DISTORTION TEMPERATURE AND MECHANICAL PROPERTIES

[75] Inventors: Sung Ryong Kim, Taejon; Young Joon Choi; Jun Seob Song, both of Seoul, all of Rep. of Korea

[73] Assignee: Samyang Corporation, Seoul, Rep. of Korea

[21] Appl. No.: 47,670

[22] Filed: Mar. 25, 1998

[30] Foreign Application Priority Data

Mar. 27, 1997 [KR] Rep. of Korea .................. 1997-10903
Sep. 25, 1997 [KR] Rep. of Korea .................. 1997-48637

[51] Int. Cl.⁶ ..................................................... C08K 5/523
[52] U.S. Cl. ......................... 524/142; 524/412; 528/196
[58] Field of Search ..................................... 524/142, 412; 528/196

[56] References Cited

U.S. PATENT DOCUMENTS 4,021,406  5/1977  Touval ..................................... 524/142
5,556,903  9/1996  Green ..................................... 524/142

*Primary Examiner*—Terressa Mosley
*Attorney, Agent, or Firm*—Michael N. Meller

[57] ABSTRACT

A flame retardant resin composition having improved heat distortion temperature and mechanical properties comprising 5–20 parts by weight of phosphate-based flame retardant and 0.01–10 parts by weight of tetrafluoroethylene powder per 100 parts by weight of PC/ABS which comprises 5–95% by weight of polycarbonate and 5–95% by weight of acrylonitrile-butadiene-styrene copolymer, characterized in that said phosphate-based flame retardant is oligomeric phosphate ester of the following formula I:

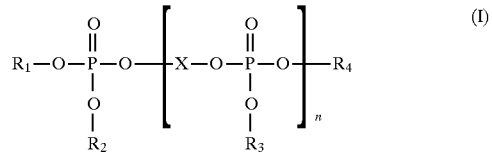

wherein $R_1$, $R_2$, $R_3$ and $R_4$ each represent cresyl group; n=1 to 3; and X is derived from dihydric bisphenol A and represented by the following formula II.

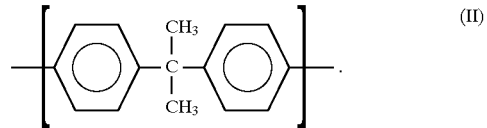

The resin composition according to the invention may be applied to the indoor applications such as the housing of domestic electric appliances, the interior decoration of automobiles, or the like.

1 Claim, No Drawings

FLAME RETARDANT POLYMER RESIN COMPOSITION HAVING IMPROVED HEAT DISTORTION TEMPERATURE AND MECHANICAL PROPERTIES

FIELD OF THE INVENTION

The invention relates to a polymer resin composition having a flame retardancy. More particularly, it relates to a polymer resin composition, in which flame-retardancy, heat distortion temperature and mechanical properties are improved by using oligomeric phosphate ester as a flame retardant.

PRIOR ART

In general, the blend of polycarbonate(PC) and acrylonitrile-butadiene-styrene copolymer(ABS) is widely used in the housing of domestic electric appliances or the interior decoration of automobiles on account of its excellent impact resistance. Since the above resin composition is widely used in indoor applications, the flame-retarding properties of these appliances have been required for a long time in the interests of fire safety.

As a result, various kinds of flame retardants have been developed for a blend (PC/ABS) to have a flame retardancy. The blend(PC/ABS) depends upon the kind of flame retardants to be used. In the past, flame retardants mainly containing halogen as a flame retardant were used. The halogen-containing flame retardants contain halogen atoms, especially chlorine or bromine atoms. Thus, the flame retardancy of the resin composition is obtained by stabilizing the activated particles which cause the decomposition of the polymer when the halogen atoms burn. The most commonly used halogen-containing flame retardant is decabromodiphenyl ether.

However, it is known that the flame retarding PC/ABS blend utilizing a halogen-containing flame retradant may generate a harmful gas when it burns. On account of concerns over environmental contamination, the use of the halogen-containing flame retardants is restricted in many countries. Thus, many studies on the development of flame retardants not containing halogen atoms have been undertaken.

Flame retardants not containing halogens are nominated non-halogen flame retardants. The most commonly used non-halogen flame retardants are phosphate-based flame retardants. However, in case of phosphate-based flame retardant, its flame retardancy is greatly inferior to that of halogen-containing flame retardants. For this reason, it is necessary to use a large quantity of the phosphate-based flame retardant in order to obtain a good flame retardancy. As a result, there is a deterioration in the resin composition's properties. In spite of this disadvantages, the phosphate-based flame retardants have been extensively studied since these flame retardants have a flame retardancy which is superior to that of other non-halogen flame retardants U.S. Pat. No. 5,061,745 to Wittmiann et al. describes a flame retardant resin composition comprising polycarbonate, graft polymer, phosphate compound and tetrafluoroethylene polymer. The resin composition has a flame retardancy which meets the requirements for obtaining a V-0 rating according to UL-94 Test, but its mechanical properties are greatly inferior to those of conventional halogen-containing flame retardants.

U.S. Pat. No. 5,204,394 to Gosens et al. describes a flame retardant resin composition comprising polycarbonate, styrene-containing graft polymer and oligomeric phosphate ester, especially resorcinol diphenyl phosphate ester. It is reported that the resin composition has a high thermal stability and improved mechanical properties as compared with those of conventional flame retarding resin composition utilizing triphenyl phosphate. However, its improved mechanical properties are not comparable to the properties of PC/ABS using halogen-containing flame retardants.

SUMMARY OF THE INVENTION

To solve the above problems, the present inventors have studied flame retardant polymer resin compositions utilizing an other oligomeric phosphate ester as a flame retardant. As a result, it is possible to develop an oligomeric phosphate ester capable of producing a resin composition, in which the heat distortion temperature property is improved while its excellent mechanical properties, e.g., tensile strength are maintained.

Based on these findings, the inventors have completed the invention.

DETAILED DESCRIPTION OF THE INVENTION

It is the object of the invention to provide a flame retardant resin composition having improved heat distortion temperature and mechanical properties.

According to the invention, in the resin composition comprising 5–20 parts by weight of phosphate-based flame retardant and 0.01–10 parts by weight of tetrafluoroethylene powder per 100 parts by weight of PC/ABS which comprises 5–95% by weight of polycarbonate and 5–95% by weight of acrylonitrile-butadiene-styrene copolymer, it is characterized in that the said phosphate-based flame retardant is oligomeric phosphate ester.

The oligomeric phosphate ester of the invention is represented by the following formula I:

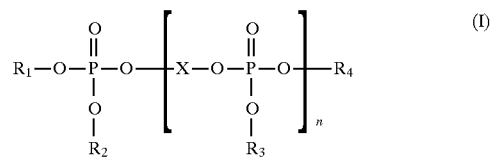

wherein, $R_1$, $R_2$, $R_3$ and $R_4$ each represent cresyl group; n=1 to 3; and X is derived from dihydric bisphenol A and represented by the formula II.

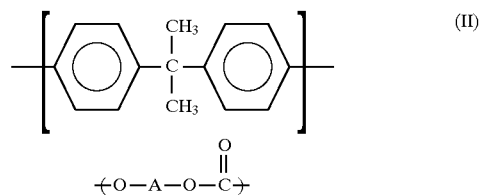

wherein A is a dihydric aromatic radical which is derived from dihydric phenol used in the preparation of the polymer. Dihydric phenol which may be used in the preparation of the aromatic polycarbonates are mononuclear or polynuclear aromatic compounds which comprise two hydroxy radicals each directly bonded to a carbon atom of an aromatic nucleus.

Suitable aromatic polycarbonates are polyester carbonates which are obtained by performing the polymerization reaction in the presence of an ester precursor, for example, bisfunctional carboxylic acid such as terephthalic acid or an ester-forming derivative thereof.

These polyester carbonates have ester bonds and carbonate bonds in the polymeric chain.

It is also possible to use a mixture of various polycarbonates.

The resin composition according to the invention preferably contains 5–95% by weight of aromatic polycarbonates.

ACRYLONITRILE-BUTADIENE-STYRENE (ABS) COPOLYMER

ABS copolymers have an excellent mouldability. They are generally prepared by the following two processes. One process is that they are prepared by blending butadiene-acrylonitrile rubber with styrene-acrylonitrile copolymer. The other process is that they are also prepared by adding polybutadiene to a mixture of styrene monomer and acrylonitrile monomer to obtain a graft In U.S. Pat. No. 5,204,394, there is described resin composition using oligomeric phosphate ester of the above formula I as a flame retardant. However, the substituent represented by X of the above formula I is different from that of X in this invention.

In U.S. Pat. No. 5,204,394, there is disclosed a resorcinol diphenly phosphate ester as oligomeric phosphate ester, in which X of the above formula I is resorcinol. In contrast, a bisphenol A dicresyl phosphate is used in this invention as a phosphate-based flame retardant, in which X of the above formula I is bisphenol A.

According to the invention, a flame retardant resin composition may contain, when necessary, other flame retardants, impact reinforcing materials or conventional additives, in addition to oligomeric phosphate ester and tetrafluoroethylene powder.

The resin composition according to the invention may comprise the following constituents, i.e., an aromatic polycarbonate, acrylonitrile-butadiene-styrene(ABS) copolymer, oligomeric phosphate ester, tetrafluoroethylene powder, other flame retardants and conventional additives.

AROMATIC POLYCARBONATES

The aromatic polycarbonates which are the main constituent of the invention are generally prepared by reacting a dihydric phenol compound with a carbonate precursor(for example, phosgene, halogen formiate, or carbonate ester). Aromatic polycarbonates are polymers which comprise units of the formula copolymer with an emulsion polymerization, and blending the graft copolymer with styrene-butadiene copolymer. The ABS copolymers used in this invention are prepared by the second process.

The resin composition according to the invention preferably contains 5–95% by weight of acrylonitrile-butadiene-styrene copolymers.

OLIGOMERIC PHOSPHATE ESTERS

The oligomeric phosphate esters are represented by the following formula I:

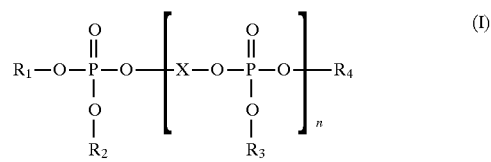

wherein $R_1$, $R_2$, $R_3$ and $R_4$ each represent cresyl group; n=1 to 3; and X is derived from dihydric bisphenol A and represented by the following formula II.

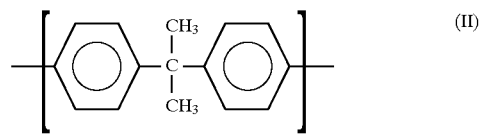

The above aryl group may be substituted with halogen atoms or alkyl group. The aryl group is preferably a cresyl or phenyl group.

The oligomeric phosphate ester used in this invention is bisphenol A dicresyl phosphate.

The resin composition according to the invention contains 5–20 parts by weight of oligomeric phosphate ester per 100 parts by weight of PC/ABS copolymer comprising the said aromatic polycarbonate and acrylonitrile-butadiene-styrene copolymer. When it is less than 5 parts by weight, a good flame retardancy over UL-94, V-1 is not obtained, and when it exceeds 20 parts by weight, the heat distortion temperature is decreased, so that such resin compositions are not adequate for many applications

TETRAFLUOROETHYLENE POWDER

The tetrafluoroethylene powder used in this invention contains 66–76% by weight of fluorine. More preferably, it contains 70–7 6% by weight of fluorine. In the invention, the tetrafluoroethylene is used in the form of powder, which is compounded with polycarbonate, polybutyrene terephtalate and phosphate. The particle size of the powder is 2–800 μm.

The resin composition according to the invention contains 0.01–10 parts by weight of tetrafluoroethylene powder per 100 parts by weight of PC/ABS copolymer.

OTHER FLAME RETARDANTS

In addition to the above oligomeric phosphate ester and tertrafluoroethylene powder, the resin composition according to the invention may comprise other agents to improve flame retardancy. In particular, the following materials may be mentioned:

a monophosphate ester, phosphate-based flame retardant of low molecular weight;

a salt having flame-retarding properties for aromatic polycarbonates;

a halogen-containing low-molecular weight compound and/or high-molecular weight polymer; and/or a metal compound acting as a synergist.

In particular, as a monophosphate ester, low-molecular weight phosphate-based flame retardants, it may be mentioned triphenyl phosphate(TPP) or tricresyl phosphate (TCP).

Salts having flame retardancy are generally known, and used on a large scale in resin compositions which contain a polycarbonate. All salts which are suitable for polymer mixtures having a polycarbonate may be used in the resin composition according to the invention. In particular, organic and inorganic sulphonates may be mentioned, for example, sodium trichlorobenzene sulphonate, salts of sulphone sulphonates, for example, potassium salt of diphenylsulphone sulphonate, salts of perfluorinated alkane sulphonic acid and sodium aluminium hexafluoride.

Examples of suitable halogen-containing compounds are decabromodiphenyl ether, octabromodiphenyl, octabromodiphenyl ether and further oligomeric or polymeric bromine compounds, for example, derived from tetrabromobisphenol A or also polyphenylene ethers brominated in the nucleus.

The polymer resin composition according to the invention may further comprise a metal compound acting as a synergist, for example, antimony oxide and the like. These synergists are usually used in combination with halogen-containing compounds.

CONVENTIONAL ADDITIVES

In addition to the above components, the polymer resin composition according to the invention may comprise one or more conventional additives, for example, impact reinforcing materials, reinforcing fibres, stabilizers, pigments and dyes, plasticizers, mould release agents, anti-static agents, talc and the like.

The polymer resin composition according to the invention can be obtained according to the conventional process for preparing the polymer mixture, for example, by compounding the said constituents in an extruder.

EXAMPLES 1 to 3

The resin compositions were prepared from the following components in the quantities as indicated in the following Table 1, in which the above components were compounded in an extruder at the temperature of 230 to 240° C. As an extruder, Twin Extruder(W&P) having a diameter of 25 mm was used.

The mechanical properties, flame-retardancy and heat distortion temperature of resin compositions prepared in Examples 1 to 3 were determined by conventional method. The results obtained were also shown in the following Table 2.

The mechanical property(tensile strength) was determined by ASTM D648, and the heat distortion temperature was determined by ASTM D638.

Comparative Examples 1 to 3

The resin compositions were prepared from the following components in the quantities as indicated in the following Table 1 using the same method as the above Examples(resin compositions described in U.S. Pat. No. 5,204,394 to Gosen et al).

The mechanical properties, flame-retardancy and heat distortion temperature of the resin compositions prepared in Comparative Examples 1 to 3 were determined by the conventional method. The results obtained were also shown in the following Table 2.

TABLE 1

| | 1)PC/2)ABS (% by weight) | 3)RDP (parts by weight) | 4)BDP (parts by weight) | 5)TFE (parts by weight) |
|---|---|---|---|---|
| Example 1 | 90/10 | — | 7 | 0.3 |
| Example 2 | 90/10 | — | 8.5 | 0.3 |
| Example 3 | 90/10 | — | 10 | 0.3 |
| Comparative Example 1 | 90/10 | 7 | — | 0.3 |

TABLE 1-continued

| | 1)PC/2)ABS (% by weight) | 3)RDP (parts by weight) | 4)BDP (parts by weight) | 5)TFE (parts by weight) |
|---|---|---|---|---|
| Comparative Example 2 | 90/10 | 8.5 | — | 0.3 |
| Comparative Example 3 | 90/10 | 10 | — | 0.3 |

Notes:
1)PC: An aromatic polycarbonate having 20,500 of the viscosity average molecular weight (a mixture of the PJ3022 and PJ3020 prepared by SamYang Co., Ltd.)
2)ABS: Acrylonitrile-butadiene-styrene copolymer
3)RDP: Resorcinol diphenyl phosphate.
4)BDP: Bisphenol A dicresyl phosphate.
5)TFE: Tetrafluoroethylene powder
Reference: The parts by weight of other components in the above Table 1 are amounts of addition per 100 parts by weight of PC/ABS.

TABLE 2

| | Tensile strength (kg/cm$^2$) | HDT* (°C.) | UL94-rating** |
|---|---|---|---|
| Example 1 | 740 | 99 | V-1 |
| Example 2 | 744 | 96 | V-1 |
| Example 3 | 741 | 96 | V-0 |
| Comparative Example 1 | 707 | 98 | V-1 |
| Comparative Example 2 | 714 | 89 | V-1 |
| Comparative Example 3 | 712 | 87 | V-0 |

*HDT: Heat distortion temperature
**UL94-rating determined according to Underwriters Laboratory.

Examples and Comparative Examples in the above Table 1 are selected to estimate the effect of the phosphate-based flame retardants on resin compositions, in which the kind and the content of the phosphate-based flame retardants are changed, respectively.

As shown in the above Table 2, the mechanical properties of the resin compositions using BDP as a flame retardant (Examples 1 to 3) are superior to those of the resin compositions using RDP(Comparative Examples 1 to 3).

As shown in the above Table 2, the heat distortion temperatures of the resin compositions according to the change in content of the flame retardants hardly decreased when the content of the flame retardants was increased in Examples 1 to 3 using BDP. In contrast, in the case of Comparative Examples 1 to 3 using RDP, the heat distortion temperatures of the resin compositions were greatly decreased when the content of the flame retardants was increased. It can be seen from the above results that the resin composition of the invention has an excellent heat distortion temperature property.

In Example 3 and Comparative Example 3 using the contents of the flame retardants(10 parts by weight) which also display the optimum flame retarding properties(UL-94, V-0 rating), it is confirmed that the resin composition using BDP rather than RDP as a flame retardant has higher heat distortion temperature. The heat distortion temperatures are almost similar to each other in Example 1 and Comparative Example 1, but it is not possible to obtain the optimum flame retardancy in both case.

As can be seen from the above results, according to the invention, it is possible to obtain simultaneously an optimum flame retardancy and a high heat distortion temperature only by using BDP as a flame retardant.

As stated above, it is noteworthy that the change in the heat distortion temperature according to the change in content of the flame retardant has an important effect upon the quality of the products when the resin composition is prepared. Thus, it is important to prepare a flame retardant resin composition with a constant heat distortion temperature which is not affected by the small change in content of the flame retardant.

The resin composition according to the invention has an excellent heat distortion temperature and mechanical properties when compared with the resin composition using other oligomeric phosphate ester as a flame retardant. Thus, the resin composition according to the invention may be applied to the indoor applications such as the housing of domestic electric appliances, the interior decoration of automobiles, or the like.

What is claimed is:

1. A flame retardant resin composition having improved heat distortion temperature and mechanical properties comprising 5–20 parts by weight of phosphate-based flame retardant and 0.01–10 parts by weight of tetrafluoroethylene powder per 100 parts by weight of PC/ABS which comprises 5–95% by weight of polycarbonate and 5–95% by weight of acrylonitrile-butadiene-styrene copolymer, characterized in that said phosphate-based flame retardant is oligomeric phosphate ester of the following formula I:

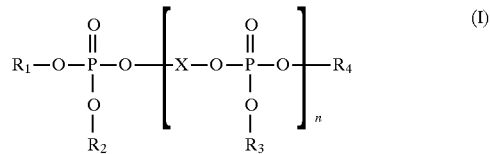

wherein $R_1$, $R_2$, $R_3$ and $R_4$ each represent cresyl group; n=1 to 3; and X is derived from dihydric bisphenol A and represented by the following formula II:

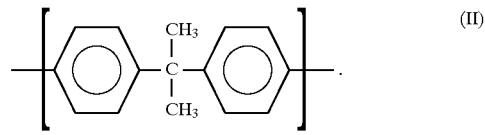

* * * * *